United States Patent
D'Antonio et al.

(10) Patent No.: US 10,935,104 B2
(45) Date of Patent: Mar. 2, 2021

(54) LOAD BINDER

(71) Applicant: Laura D'Antonio, Hamilton (CA)

(72) Inventors: Laura D'Antonio, Hamilton (CA); Tony Stewart, Scarborough (CA)

(73) Assignee: Laura D'Antonio, Hamilton (CA)

( * ) Notice: Subject to any disclaimer, the term of this patent is extended or adjusted under 35 U.S.C. 154(b) by 0 days.

(21) Appl. No.: 16/699,432

(22) Filed: Nov. 29, 2019

(65) Prior Publication Data

US 2020/0284319 A1    Sep. 10, 2020

Related U.S. Application Data

(60) Provisional application No. 62/772,886, filed on Nov. 29, 2018, provisional application No. 62/794,246, filed on Jan. 18, 2019.

(51) Int. Cl.
*B60P 7/08* (2006.01)
*F16G 11/12* (2006.01)

(52) U.S. Cl.
CPC .............. *F16G 11/12* (2013.01); *B60P 7/083* (2013.01)

(58) Field of Classification Search
CPC ................................. F16G 11/12; B60P 7/083
See application file for complete search history.

(56) References Cited

U.S. PATENT DOCUMENTS

| | | | | |
|---|---|---|---|---|
| 4,399,721 A * | 8/1983 | Jedlicka | .................. | F16G 11/12 81/54 |
| 4,817,463 A * | 4/1989 | Cameron | .............. | B60T 11/046 188/2 D |
| 5,295,664 A * | 3/1994 | Kamper | .................. | B60P 7/083 254/220 |
| 5,560,087 A * | 10/1996 | Marques | ................. | F16L 33/08 24/19 |
| 5,671,506 A * | 9/1997 | Eliasson | ................. | F16L 33/08 24/19 |
| 6,389,654 B1 * | 5/2002 | Tunno | ..................... | F16L 33/08 24/19 |
| 2010/0166520 A1 * | 7/2010 | Ruan | ....................... | B60P 7/083 410/103 |
| 2010/0166521 A1 * | 7/2010 | Ruan | ....................... | B60P 7/083 410/103 |
| 2012/0227223 A1 * | 9/2012 | Knox | ....................... | B60P 7/083 24/68 CD |
| 2014/0061556 A1 * | 3/2014 | Knox | ....................... | B60P 7/083 254/220 |
| 2015/0040359 A1 * | 2/2015 | Brown | .................... | B60P 7/083 24/68 CD |
| 2019/0315263 A1 * | 10/2019 | Vande Sande | ........ | B60P 7/0807 |

* cited by examiner

*Primary Examiner* — Jason W San
(74) *Attorney, Agent, or Firm* — Patent Law of Virginia, PLLC; Brian J. Teague

(57) ABSTRACT

A load binder includes: a body; a slotted spool rotatably attached to the body and about which a strap can be coiled; a ratchet mechanism coupled to the body and spool and including a shaft and a button, the shaft being adapted, by virtue of a hexagon head, to be turned, the ratchet mechanism, being adapted, when the shaft is turned, to rotate the spool, and being further adapted, when the button is depressed, to release the spool for free rotation; and a wrench, releasably secured to the body, and adapted, when released from the body, to engage the hexagon head of the shaft.

4 Claims, 8 Drawing Sheets

LOAD BINDER

CROSS-REFERENCE TO RELATED APPLICATIONS

This application claims priority under 35 U.S.C. § 120 from U.S. Provisional Patent Application No. 62/772,886, filed Nov. 29, 2018. The entire contents of each of these priority applications and are incorporated herein by reference.

FIELD

The invention relates to the field of load binding.

BACKGROUND

Load binders are well known. Many load binders are of the ratchet-type and are relatively inconvenient to use and store.

SUMMARY

A load binder comprises a body, a slotted spool rotatably attached to the body and about which a strap can be coiled, and a ratchet mechanism coupled to the body and the slotted spool. The ratchet mechanism comprises a worm gear configured to be rotatable by a drive tool in only one direction. A round gear meshed is with the worm gear and a bolt engages the round gear and an end wall of the spool to drive rotation of the spool in the same direction. A release button is engaged with the bolt to disengage the bolt from the end wall of the spool when the release button is depressed by a force, thereby permitting the spool to freely rotate by an external force. The load binder further comprises a spring placed on the bolt between the round gear and the release button to push the release button to re-engage the bolt with the end wall of the spool. The load binder further comprises a safety clip removably inserted between the release button and the round gear to prevent a user accidentally depressing the release button.

Advantages, features and characteristics of the invention will become evident upon review of the following detailed description with reference to the accompanying drawings which show an embodiment of the invention, the drawings being briefly described hereinafter.

DETAILED DESCRIPTION

Figure 1:
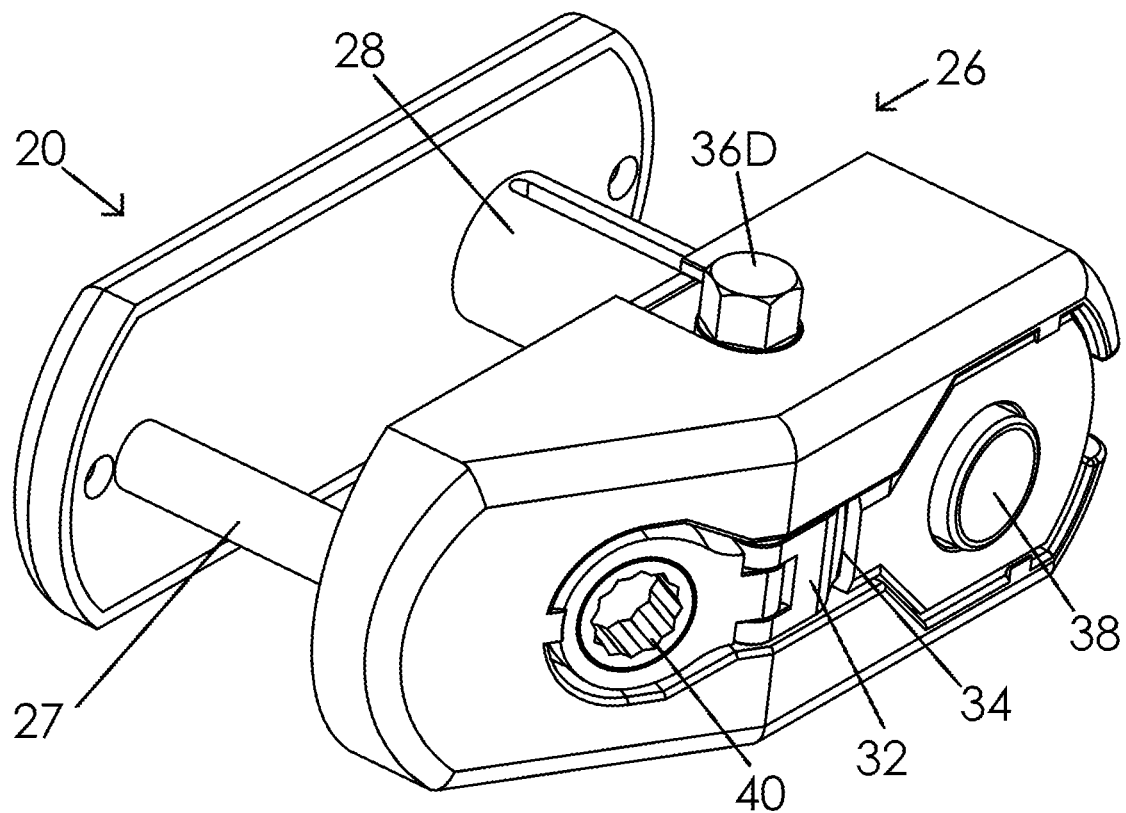
FIG. 1 is a perspective view of a load binder according to the embodiment.

The load binder 20 shown in the figures includes a body 26, a spool 28, a ratchet mechanism 30, a drive tool 32 and a recess 34.

The body 26 includes a pair of plates 51a and 51b. Each of the two ends of the plate 51a has two through holes 51a1, 51a2 and each of the two ends of the plate 51b has two through holes 51b1, 51b2. Each of the through holes 51a2 and 51b2 receives a respective end 27a and 27b of an element 27, and fasteners 49a and 49b securely fasten the two ends 27a and 27b of the element 27 to respective outer surface of the plates 51a and 51b; the through holes 51a1 and 51b1 each receive an end of the spool 28 and the fasteners 53a and 53b rotatably secure the two ends 28a and 28b of the spool 28 to respective outer surfaces of the plates 51a and 51b.

Spool 28 has a slot 28s defined therein.

The load binder 20 is used with a first strap 22 and a second strap 24. The first strap 22 has a first end and a second end. The first strap 22 terminates in a loop at the first end which encircles element 27.

The second strap 24 has a first end and a second end. The first end may be secured to the spool by being passed through slot 28s on the spool 28 and wrapped around itself in a conventional manner. It will be understood that the strap 24 may be coiled on the spool 28 by rotating the spool 28 in one direction and played out from the spool 28 by rotating the spool 28 in another direction.

The ratchet mechanism 30 is adapted to selectively rotate the spool 28 in the one direction and to selectively release the spool 28 for rotation in the other direction, all as discussed below.

In the example, ratchet mechanism 30 has a bolt 35, a worm gear 36, a round gear 37 meshed with the worm gear 36 and a release button 38.

Worm gear 36 is rotatably mounted on an outer side of the body 26, on the outer side of plate 51a. Two plates 36a and 36b are securely mounted on the outer surface of the plate 51a and the worm gear 36 is mounted on the plates 36a and 36b. The worm gear 36 is configured to be rotatable by the drive tool 32 in only one direction. The worm gear 36 may be a right or left hand helical gear. In the example of FIGS. 1-4, the worm gear 36 terminates in a hexagonal drive head 36D and the drive tool 32 has a corresponding ratcheting socket end 40 to engage the drive head for rotating in one direction.

Figure 6:
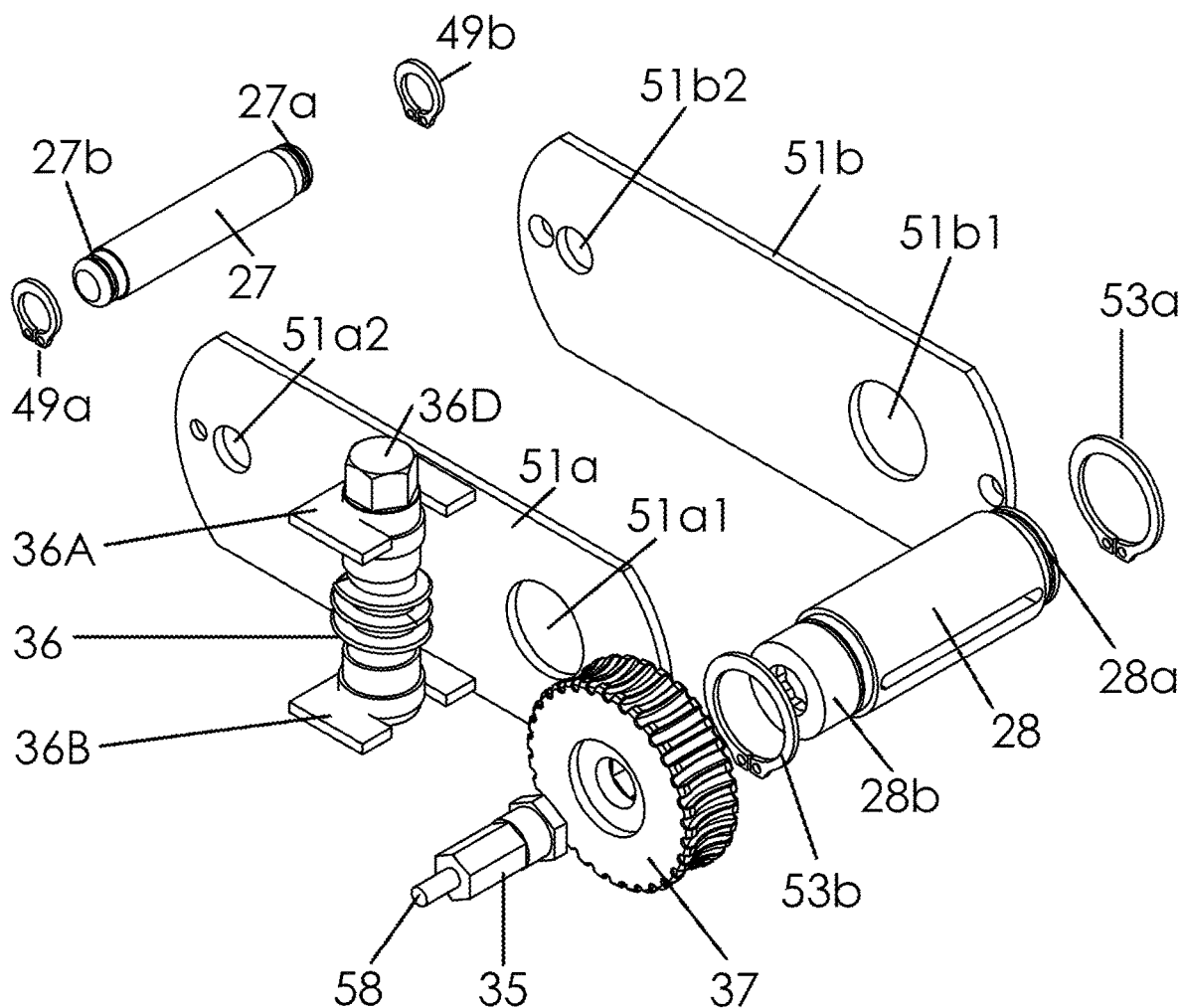
FIG. 6 is an exploded perspective view of the load binder of FIG. 5.
Figure 7:
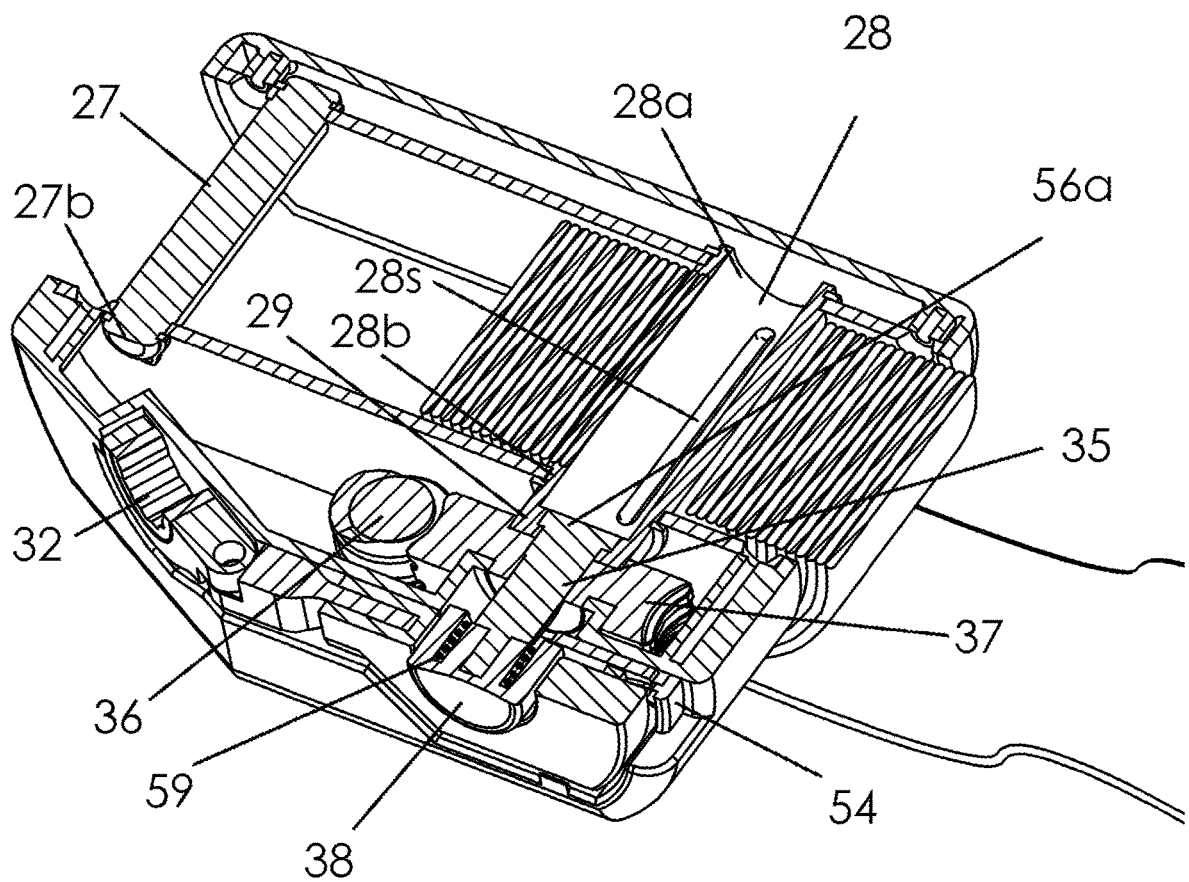
FIG. 7 is a partial top cross-sectional view of FIG. 2.
Figure 8:
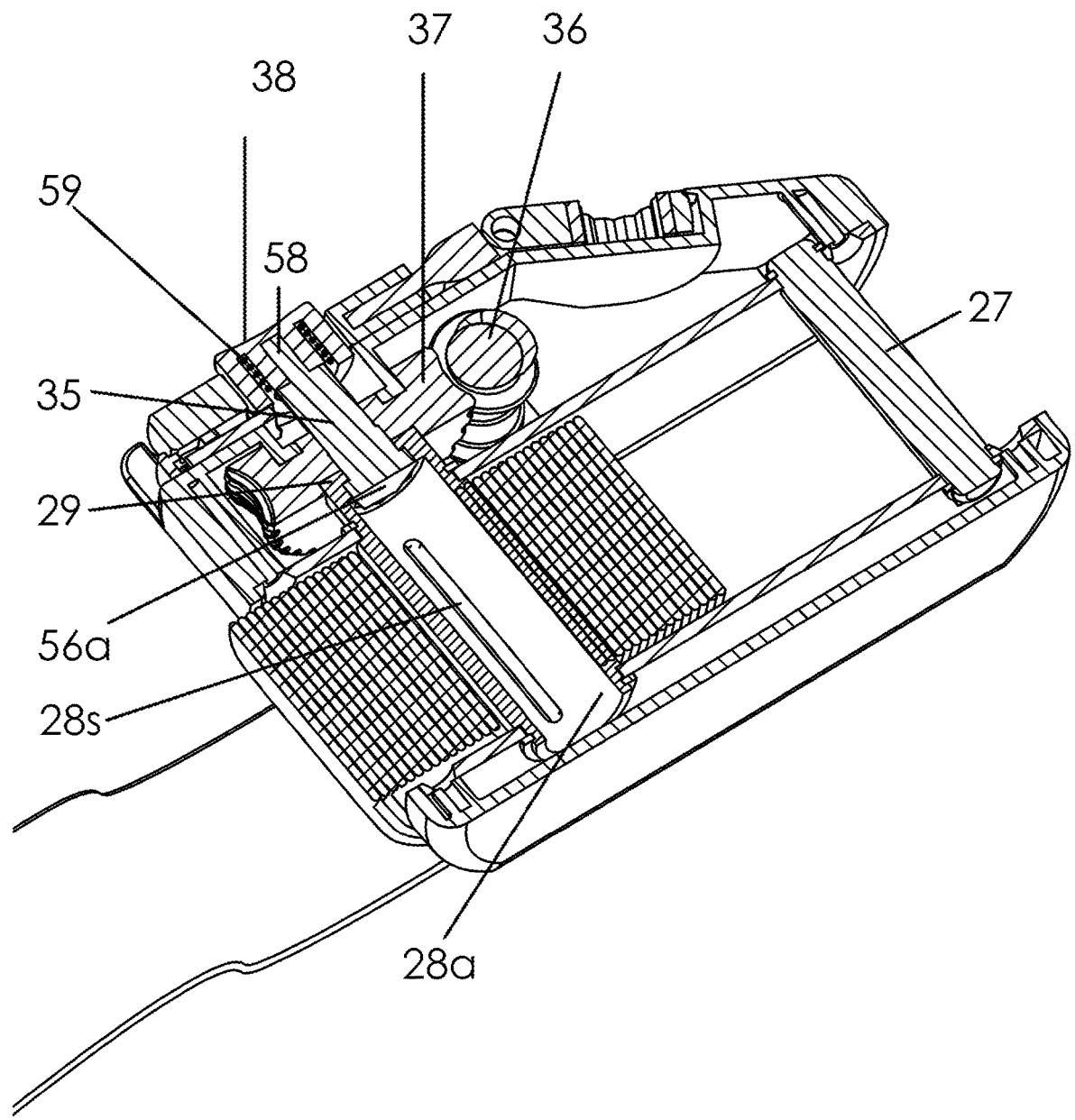
FIG. 8 is a partial rear cross-sectional view of FIG. 2.

The bolt 35 securely engages the round gear 37 and one end wall 29 of the spool 28. The end wall 29 is formed at the end of 28b. The round gear 37 has a larger size than the through hole 51a. The end wall 29 of spool 28 has a socket to engage an end 56a of the bolt 35. The bolt 35 also engages the round gear 37 substantially at the axis of the round gear 37. As such, rotating the worm gear 36 drives rotation of the round gear 37 in one direction, rotation of the round gear 37 in turn rotates the bolt 35 in the same direction, and the rotation of the bolt 35 drives the spool 28 to rotate in the same direction. In use, the second strap 22 may be coiled on the spool 28 by the rotation of the spool 28. The second strap 22 may also be played out from the spool 28 by the rotation of the spool 28. As shown in FIGS. 6-8, the portion of the bolt 35 engaging the end wall 29 and the round gear 37 has a hexagonal profile and the sockets at end wall 29 and at the round gear 37 have the corresponding profile to engage the portions of the bolt 35. As shown in FIGS. 7 and 8, the end portion 56a of the bolt 35 engaging the end wall 29 has a larger size for securely retaining the bolt 35 within the end wall 29. The bolt 35 is inserted into the hollow spool 28 from the other end 28b for the portion 56a to engage the end wall 29.

As shown in FIGS. 6-8, the second end of the bolt 35 extends out from the round gear 37 to engage a release button 38. A spring 59 is placed on the bolt 35 and between the round gear 37 and the release button 38. In the example of FIGS. 7 and 8, the button 38 may cover a portion of the spring 59. When the button 38 is depressed by a force, such as from a user, the end portion 56a of the bolt 35 may intrude into the internal space within the spool 28 and disengage from the end wall 29. The spool 28 in this case is unlocked from the bolt 35 and may freely rotate by an external force. For example, the second strap 22 may be played out from the spool 28 by pulling the strap 22 out from the spool 28, for example by a hand of a user. The second strap 22 may also be coiled on the spool 28 by rotating the strap 22 on the spool 28, for example by a hand of a user. When the force applied to the button 38 is removed, the spring 59 resumes to the original state and the button 38 is pushed by the spring away from the round gear 37. As a result, the button 38 pulls the end portion 56a of the bolt 35 back to re-engage the end wall 29. The spool 28 in this case is in a locked position as the round gear 37 is locked by the worm gear 36. In the locked position, only the round gear 37 rotated by the worm gear 36 may rotate the bolt 35, which in turn rotates the spool 28 as described above.

In the example of FIG. 6, the bolt 35 has a round second portion 58 to engage the button 38.

Figure 5:
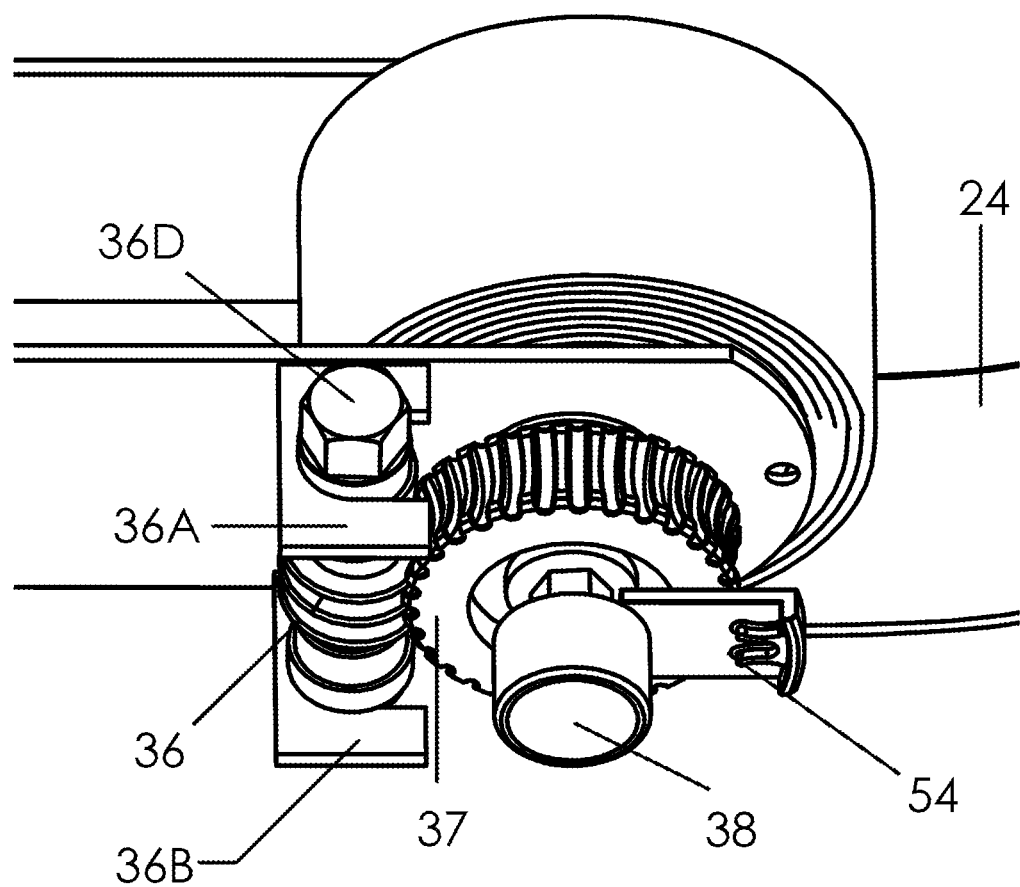
FIG. 5 is a perspective view of the load binder of FIG. 2 without the front cover.

As illustrated in FIGS. 5 and 7, a safety clip 54 may be securely inserted between the button 38 and the round gear 37 to prevent a user from accidentally depressing the button 38 and switching the spool 28 to an unlocked position. In this case, the user has to remove the safety clip 54 before depressing the button 38.

Figure 2:
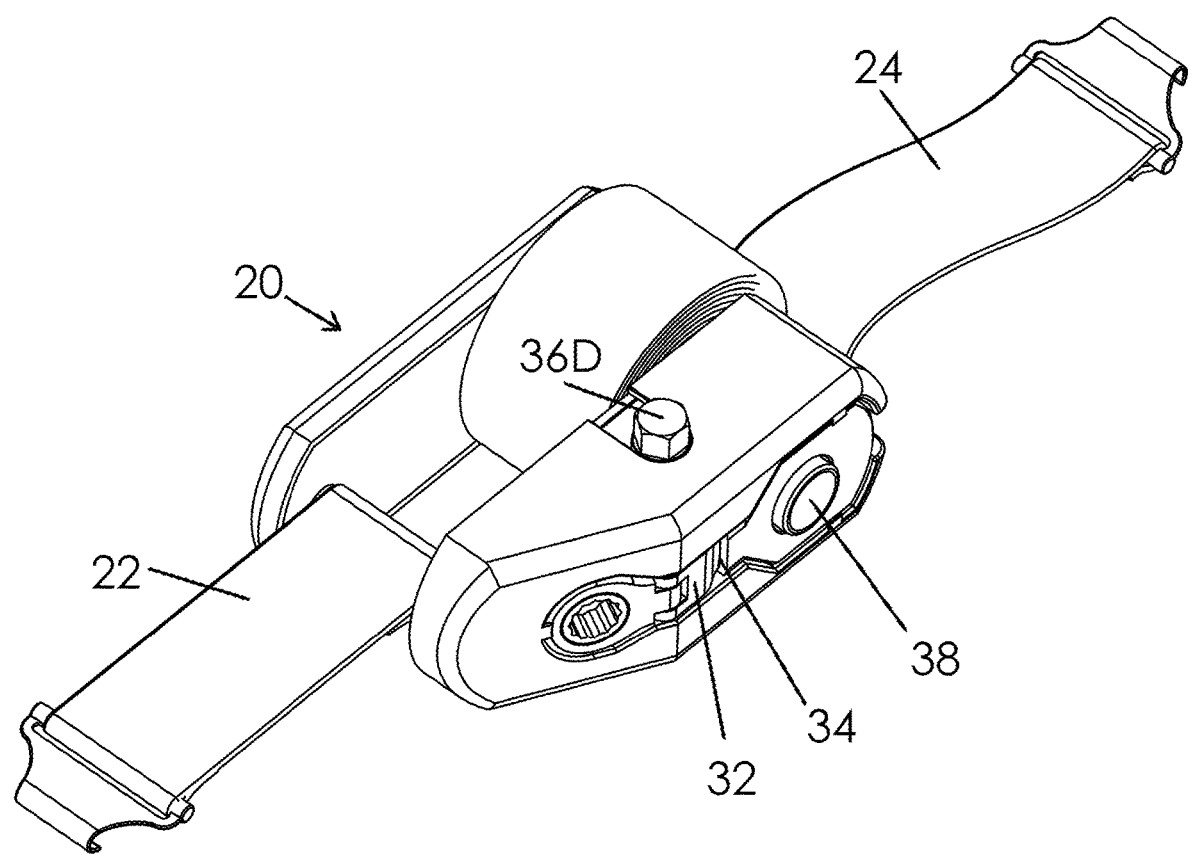
FIG. 2 is a perspective view of the load binder of FIG. 1 assembled for use with straps.
Figure 3:
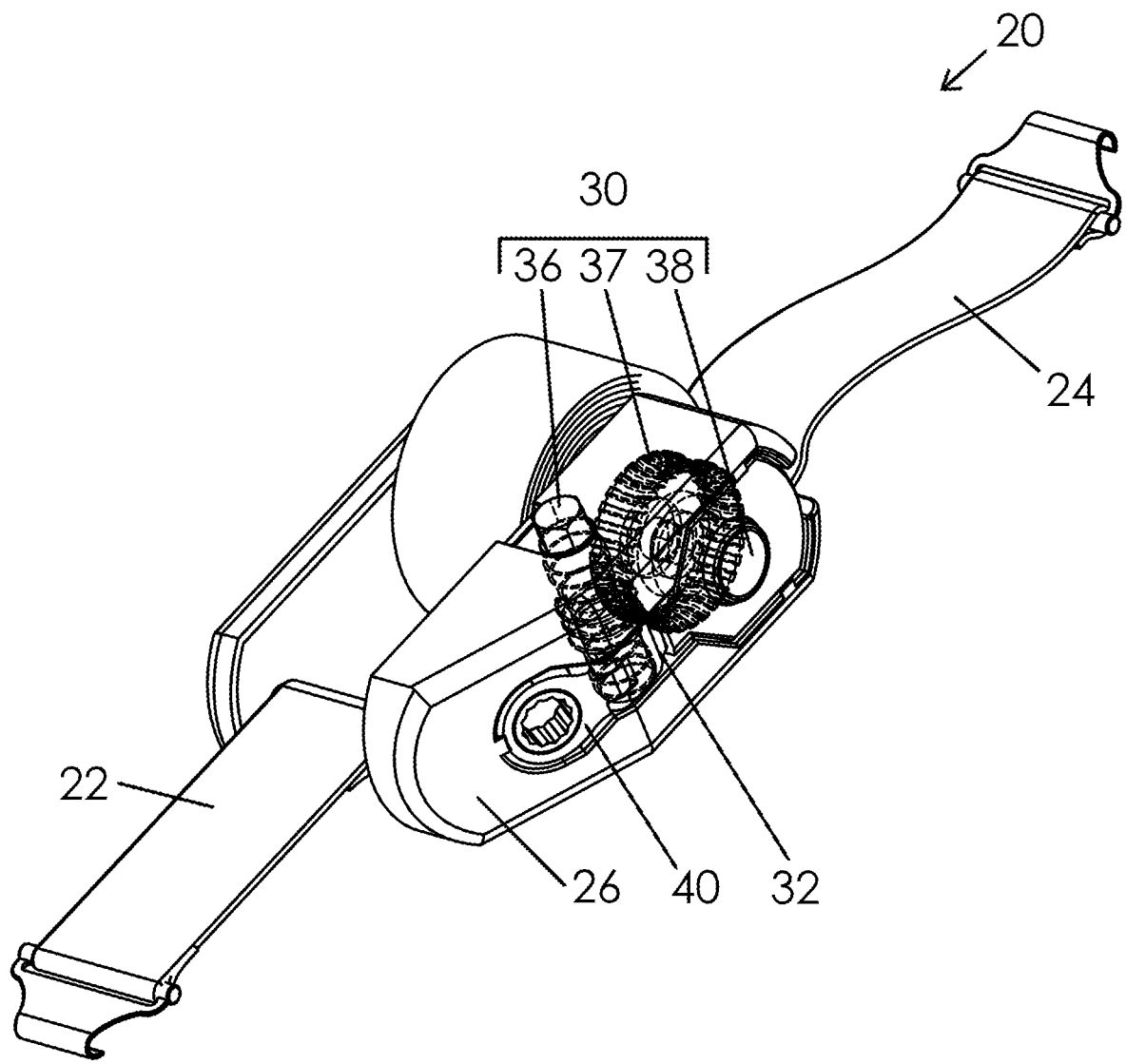
FIG. 3 is a perspective view of the load binder of FIG. 2 with portions shown transparent, for clarity.
Figure 4:
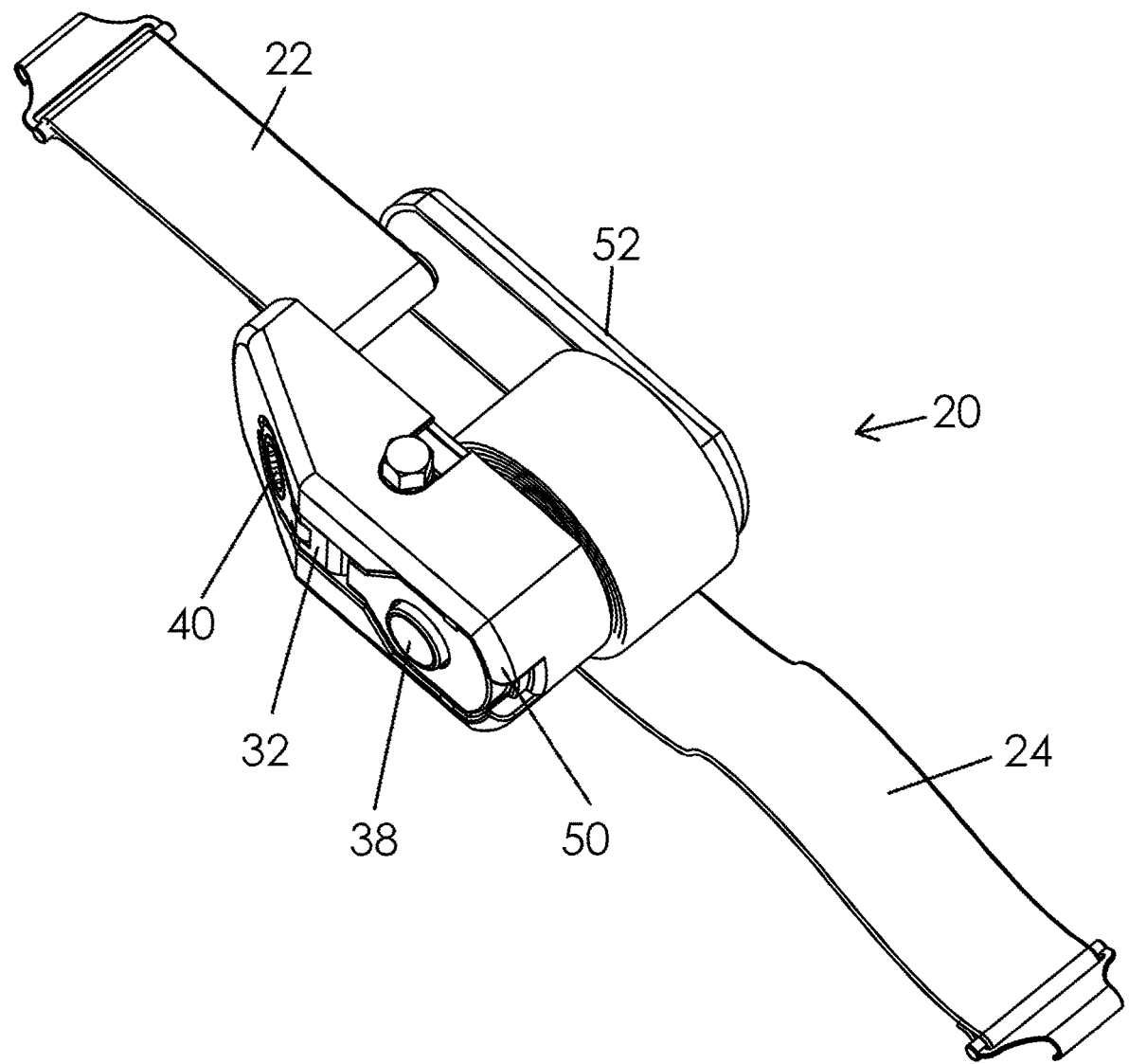
FIG. 4 is a perspective view of the load binder of FIG. 2.

As shown in FIGS. 1, 2 and 7, the body 26 includes cover 50 which covers the side panel 51a, the end 27a to prevent foreign objects from entering into the element 27 and to protect the ratchet mechanism 30. The cover 50 also includes a recess 34 adapted for nested receipt of the drive tool 32. The drive tool 32 may be withdrawn from the recess 34 and engaged to the drive head 36 and the drive tool 32 may be rotated in the manner of a wrench or a conventional socket to rotate the drive head 36. Body further includes cover 52 which covers the side panel 51b and the ends 27b and 28b to prevent foreign objects from entering into the element 27 and the spool 28.

Certain adaptations and modifications of the described embodiments can be made. Therefore, the above discussed embodiment is to be considered to be illustrative and not restrictive; the scope of the invention should be understood to be limited only by the issued claims, purposively construed.

The invention claimed is:

1. A load binder, comprising:
a body;
a slotted spool rotatably attached to the body and about which a strap can be coiled;
a ratchet mechanism coupled to the body and the slotted spool, said ratchet mechanism comprising (i) a worm gear configured to be rotatable by a drive tool in only one direction, (ii) a round gear meshed with and rotatable by the worm gear, and (iii) a bolt engaging the round gear and an end wall of the spool to drive rotation of the spool in a same direction as the round gear; and
a release button engaged with the bolt to disengage the bolt from the end wall of the spool when the release button is depressed by a force, thereby permitting the spool to freely rotate by an external force.

2. The load binder of claim 1, further comprising a spring placed on the bolt between the round gear and the release button to push the release button to re-engage the bolt with the end wall of the spool.

3. The load binder of claim 1, further comprising a safety clip removably inserted between the release button and the round gear to prevent a user accidentally depressing the release button.

4. The load binder of claim 1, wherein the body includes a cover having a recess adapted for nested receipt of the drive tool.

\* \* \* \* \*